United States Patent
Konik et al.

(10) Patent No.: US 10,965,750 B2
(45) Date of Patent: Mar. 30, 2021

(54) DISTRIBUTED MANAGEMENT OF DYNAMIC PROCESSING ELEMENT CONNECTIONS IN STREAMING APPLICATIONS

(71) Applicant: International Business Machines Corporation, Armonk, NY (US)

(72) Inventors: Rafal P. Konik, Oronoco, MN (US); Jingdong Sun, Rochester, MN (US); Jessica R. Eidem, Rochester, MN (US); Roger A. Mittelstadt, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 16/143,926

(22) Filed: Sep. 27, 2018

(65) Prior Publication Data

US 2020/0106833 A1  Apr. 2, 2020

(51) Int. Cl.
*H04L 29/08* (2006.01)
*H04L 29/06* (2006.01)
(Continued)

(52) U.S. Cl.
CPC ........ *H04L 67/1097* (2013.01); *G06F 9/4881* (2013.01); *G06F 9/54* (2013.01);
(Continued)

(58) Field of Classification Search
CPC ...... G06F 9/4881; G06F 9/54; G06F 11/3006; G06F 11/3041; H04L 67/1097; H04L 65/4069
See application file for complete search history.

(56) References Cited

U.S. PATENT DOCUMENTS

| | | | |
|---|---|---|---|
| 8,943,120 B2 * | 1/2015 | Branson | H04L 69/16 709/201 |
| 8,972,480 B2 * | 3/2015 | Branson | H04L 67/10 709/201 |

(Continued)

OTHER PUBLICATIONS

Apache Software Foundation. "Apache Storm Tutorial", version 1.2.2, publicly posted Sep. 19, 2018, 9 pages. (Year: 2018).*

(Continued)

*Primary Examiner* — George C Neurauter, Jr.
(74) *Attorney, Agent, or Firm* — Martin & Associates, LLC; Derek P. Martin

(57) ABSTRACT

Dynamic connections between processing elements of a streaming application are managed in a distributed manner by the processing elements to increase efficiency and performance of real-time connection updates. A streams application management service includes a connection manager that notifies all processing elements when a job with a new processing element is submitted. Each processing element dynamically maintains its own connections based on one or more of the following conditions: connection data received from the streams management service, and a behavior change of the processing element. Then the processing element reports connection updates to the connection manager in the streams management service. The connection manager may store updated connection information in the connection data.

18 Claims, 5 Drawing Sheets

(51) Int. Cl.
  *G06F 9/48* (2006.01)
  *G06F 11/30* (2006.01)
  *G06F 9/54* (2006.01)

(52) U.S. Cl.
  CPC ...... *G06F 11/3006* (2013.01); *G06F 11/3041* (2013.01); *H04L 65/4069* (2013.01)

(56) References Cited

U.S. PATENT DOCUMENTS

| | | | | |
|---|---|---|---|---|
| 9,043,381 | B2* | 5/2015 | Branson | G06F 9/30 |
| | | | | 709/201 |
| 9,069,543 | B2* | 6/2015 | Branson | G06F 9/5027 |
| 9,183,107 | B2 | 11/2015 | Branson et al. | |
| 9,195,559 | B2 | 11/2015 | Branson et al. | |
| 9,325,742 | B1* | 4/2016 | Barsness | G06F 16/254 |
| 9,471,639 | B2* | 10/2016 | Branson | G06F 16/20 |
| 9,497,250 | B2* | 11/2016 | Branson | H04L 67/02 |
| 9,600,527 | B2* | 3/2017 | Branson | G06F 16/20 |
| 9,674,230 | B1* | 6/2017 | Barsness | H04L 65/00 |
| 9,814,295 | B2 | 11/2017 | Chiasson | |
| 9,917,900 | B2* | 3/2018 | Branson | H04L 67/1097 |
| 9,965,518 | B2* | 5/2018 | Branson | G06F 16/24568 |
| 10,191,881 | B2* | 1/2019 | Goh | G06F 13/4221 |
| 10,469,396 | B2* | 11/2019 | Mellor | H04L 67/10 |
| 10,614,018 | B2* | 4/2020 | Fawcett | G06F 13/4068 |
| 10,785,272 | B2* | 9/2020 | Hong | H04L 65/4069 |
| 2014/0164601 | A1* | 6/2014 | Branson | G06F 9/54 |
| | | | | 709/224 |
| 2014/0164628 | A1 | 6/2014 | Branson | G06F 9/54 |
| | | | | 709/227 |
| 2016/0156514 | A1 | 6/2016 | Salonidis et al. | |
| 2016/0335287 | A1* | 11/2016 | Li | G06F 16/1748 |
| 2016/0364451 | A1* | 12/2016 | Barsness | G06F 16/9024 |
| 2016/0366201 | A1* | 12/2016 | Barsness | H04L 65/608 |
| 2017/0004014 | A1 | 1/2017 | Branson et al. | |
| 2017/0063724 | A1* | 3/2017 | Cao | G06F 16/24568 |
| 2017/0249126 | A1* | 8/2017 | Manevich | G06F 11/3664 |
| 2017/0262326 | A1* | 9/2017 | Barsness | G06F 11/3696 |
| 2017/0344600 | A1* | 11/2017 | Eidem | G06F 16/24568 |
| 2018/0074852 | A1* | 3/2018 | Bishop | G06F 9/44521 |
| 2018/0324239 | A1* | 11/2018 | Powis | G06F 16/24568 |
| 2019/0004864 | A1* | 1/2019 | Papageorgiou | G06F 9/5066 |
| 2019/0065162 | A1* | 2/2019 | Thambidorai | G06F 8/47 |
| 2019/0250947 | A1* | 8/2019 | Bishop | G06F 9/45504 |
| 2019/0347351 | A1* | 11/2019 | Koomthanam | H04L 41/084 |
| 2019/0394037 | A1* | 12/2019 | Sun | H04L 9/08 |
| 2020/0026605 | A1* | 1/2020 | Barsness | G06F 11/1438 |
| 2020/0106833 | A1* | 4/2020 | Konik | H04L 67/1097 |
| 2020/0134073 | A1* | 4/2020 | Konik | G06F 16/23 |
| 2020/0151271 | A1* | 5/2020 | Mittelstadt | H04L 9/3239 |

OTHER PUBLICATIONS

Neumayer et al. "S4: Distributed Stream Computing Platform", ICDMW '10: Proceedings of the 2010 IEEE International Conference on Data Mining Workshops, Dec. 2010, 8 pages. (Year: 2010).*

Hirzel M. et al. "IBM Stream Processing Language: Analyzing Big Data in motion", 2013, 11 pages. (Year: 2013).*

Zaharia et al. "Discretized Streams: Fault-Tolerant Streaming Computation at Scale", SOSP'13, Nov. 3-6, 2013, Farmington, Pennsylvania, USA, 16 pages. (Year: 2013).*

Jacques-Silva et al. "Consistent Regions: Guaranteed Tuple Processing in IBM Streams", Proceedings of the VLDB Endowment, vol. 9, No. 13, 2016, 12 pages. (Year: 2016).*

KrisWH. "How to Change Connections at Runtime with Export and Import", IBM Streamsdev, published Feb. 22, 2017, 5 pages. (Year: 2017).*

KrisWH. "Using Import and Export", IBM Streamsdev, published Aug. 14, 2014, 9 pages. (Year: 2014).*

Gulisano, Vincenzo, "StreamCloud: An Elastic Parallel-Distributed Stream Processing Engine", Ph.D. Thesis, Universidad Politécnica de Madrid, Dec. 21, 2012.

De Assuncao et al., "Distributed Data Stream Processing and Edge Computing: A Survey on Resource Elasticity and Future Directions", Dec. 5, 2017.

Vogler et al., "Ahab: A Cloud-based Distributed Big Data Analytics Framework for the Internet of Things", Software Practice and Experience, 2016.

Disclosed Anonymously, "An Endpoint Analytics Processor for Providing Efficient Endpoint Analytics Services", IP.com No. IPCOM000238931D, Sep. 25, 2014.

Disclosed Anonymously, "A System and Method for Smart Workload Management on Asymmetric Multicore Architectures", IP.com No. IPCOM000236928D, May 22, 2014.

* cited by examiner ately relates to a system and method for
distributed management of dynamic processing-element
connections in streaming applications.

DISTRIBUTED MANAGEMENT OF DYNAMIC PROCESSING ELEMENT CONNECTIONS IN STREAMING APPLICATIONS

BACKGROUND

1. Technical Field

This disclosure generally relates to computer processing, and more specifically relates to a system and method for distributed management of dynamic processing-element connections in streaming applications.

2. Background Art

Streaming applications are becoming more common due to the high performance that can be achieved from near real-time processing of streaming data. A streaming application is organized as a data flow graph consisting of multiple processing elements or operators connected via stream connections that each process streaming data in near real-time. A processing element typically takes in streaming data in the form of data tuples, operates on the tuples in some fashion, and outputs the processed tuples to the next processing element or operator in the flow graph.

A streams application management service (SAM) is used to manage processing elements and operators of streaming applications. The SAM handles job management tasks, including user requests such as job submission and cancellation. The SAM also interacts with a scheduler to compute the placement of processing elements that are associated with an application. The prior art SAM centrally manages dynamic connections between processing elements.

BRIEF SUMMARY

Dynamic connections between processing elements of a streaming application are managed in a distributed manner by the processing elements to increase efficiency and performance of real-time connection updates. A streams application management service includes a connection manager that notifies all processing elements when a job with a new processing element is submitted. Each processing element dynamically maintains its own connections based on one or more of the following conditions: connection data received from the streams management service, and a behavior change of the processing element. Then the processing element reports connection updates to the connection manager in the streams management service. The connection manager may store updated connection information in the connection data.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The disclosure and claims herein relate to a system and method for managing dynamic connections between processing elements of a streaming application in a distributed manner by the processing elements to increase efficiency and performance of real-time connection updates. A streams application management service includes a connection manager that notifies all processing elements when a job with a new processing element is submitted. Each processing element dynamically maintains its own connections based on one or more of the following conditions: connection data received from the streams management service, and a behavior change of the processing element. Then the processing element reports connection updates to the connection manager in the streams management service. The connection manager may store updated connection information in the connection data.

Figure 1:
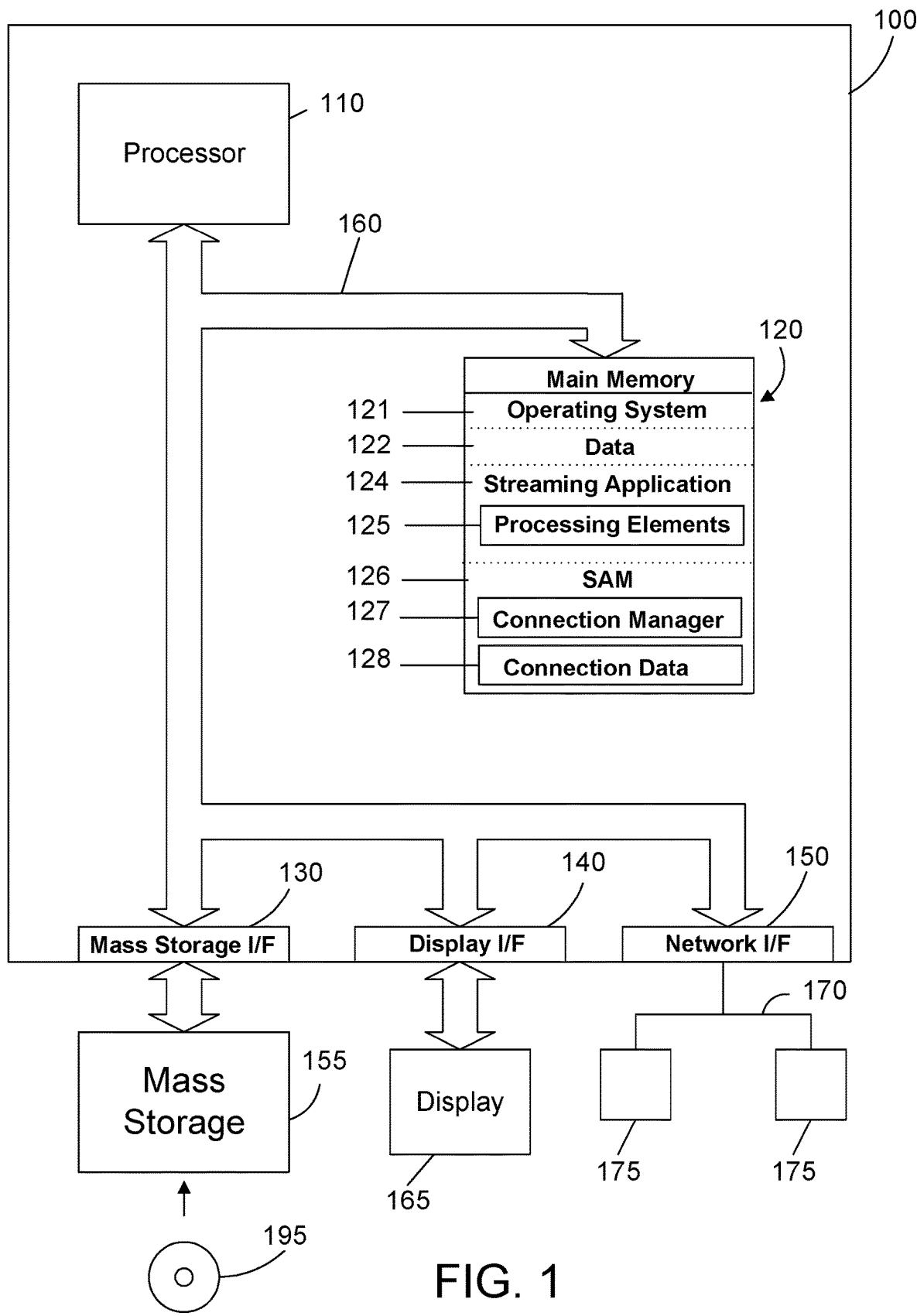
FIG. 1 is a block diagram a computer system with dynamic management of processing element connections in streaming applications with a streams application management service.

Referring to FIG. 1, a computer system 100 is one suitable implementation of a computer system that is capable of performing the computer operations described herein including dynamic management of processing element connections in streaming applications. Computer system 100 is a computer which can run multiple operating systems including the IBM i operating system. However, those skilled in the art will appreciate that the disclosure herein applies equally to any computer system, regardless of whether the computer system is a complicated multi-user computing apparatus, a single user workstation, laptop, phone or an embedded control system. As shown in FIG. 1, computer system 100 comprises one or more processors 110. The computer system 100 further includes a main memory 120, a mass storage interface 130, a display interface 140, and a network interface 150. These system components are interconnected through the use of a system bus 160. Mass storage interface 130 is used to connect mass storage devices with a computer readable medium, such as mass storage 155, to computer system 100. One specific type of mass storage 155 is a readable and writable CD-RW drive, which may store data to and read data from a CD-RW 195. Some mass storage devices may have a removable memory card or similar instead of the CD-RW drive.

Main memory 120 preferably contains an operating system 121. Operating system 121 is a multitasking operating system known in the industry as IBM i; however, those skilled in the art will appreciate that the spirit and scope of this disclosure is not limited to any one operating system. The memory 120 further includes data 122 and one or more streaming applications 124 with processing elements 125.

The memory 120 also includes a streams application management service (SAM) 126 that includes a connection manager 127 and connection data 128. The streams application management service 126 deploys and manages processing elements 125 of the streaming applications 124 as described further below.

Computer system 100 utilizes well known virtual addressing mechanisms that allow the programs of computer system 100 to behave as if they only have access to a large, single storage entity instead of access to multiple, smaller storage entities such as main memory 120 and mass storage 155. Therefore, while operating system 121, data 122, streaming applications 124, processing elements 125, the streams application management service 126, the connection manager 127 and the connection data 128 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 121 and later executes the program instructions that make up the streaming applications 124 as directed by a user and the streams application manager 126.

Although computer system 100 is shown to contain only a single processor and a single system bus, those skilled in the art will appreciate that the system may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150, e.g. web client based users.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
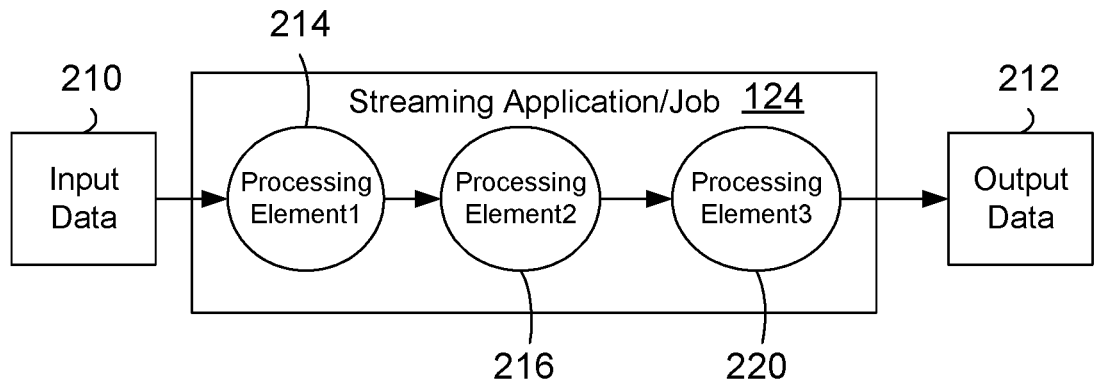
FIG. 2 is block diagram of a sample streaming application.

FIG. 2 illustrates a block diagram of data flow in a streaming application or job 124 for deployment in a computer system such as a cluster computer system that could include, for example, computer system 100 shown in FIG. 1. As used herein, a job is a streaming application or a portion of a streaming application. The streaming application 124 receives input data 210 and produces output data 212. The streaming application 124 is deployed to one or more nodes in a computer system such as a cluster computer or cloud. In this simplified example, the streaming application 124 has three processing elements, namely processing element1 214, processing element2 216, and processing element3 220. Processing element1 214 receives input data 210 and originates a stream of tuples, which is processed by processing element2 216, which outputs tuples to processing element3 220. The tuples from processing element2 216 are processed by processing element3 220, which outputs tuples to the data output 212.

Figure 3:
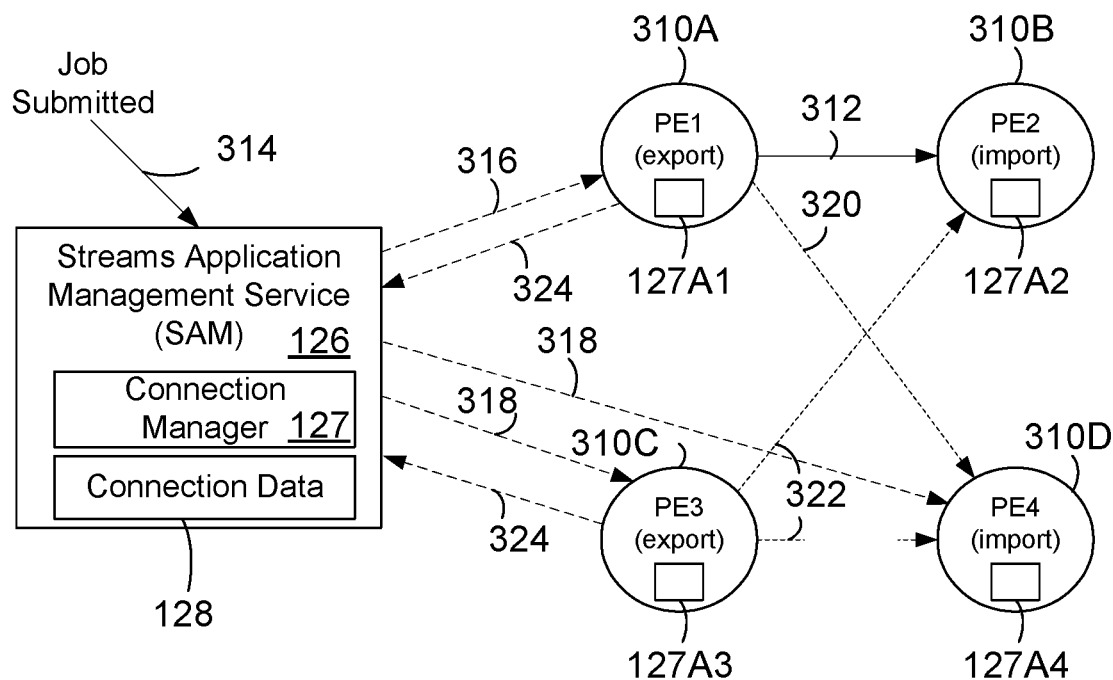
FIG. 3 is block diagram of an example of distributed management of dynamic processing element connections in a streaming application.

FIG. 3 is a simplified block diagram to illustrate distributed management of dynamic processing element connections in a streaming application. The streams application management service (SAM) 126 includes a connection manager 127 and connection data 128 as introduced above with reference to FIG. 1. The SAM 126 manages deployment of processing elements on computer resources such as computer systems in a computer cluster or cloud. Processing elements are portions of a streaming application. In this example, the SAM 126 is managing four processing elements 310A-D, and collectively referenced as processing elements 310. Each processing element 310 dynamically maintains its own connections to all other processing elements 310. The processing elements 310 make connections based on properties, subscriptions or permissions contained in the connection data 128. These properties, subscriptions or permissions define a condition to make a connection. The processing elements 310 report connection updates to the connection manager 127. The connection manager 127 may also maintain a record of the updated connections in the connection data 128.

Again referring to FIG. 3, the four processing elements 310A-D managed by the SAM include export processing elements 310A, 310C and import processing elements 310B, 310D. An export processing element is a processing element that exports data to a subsequent import processing element which imports the data from the export processing element. It should be understood that the example shown in FIG. 3 is very simplified. In a typical environment a processing element may function as both an export processing element and an import processing element. Further, the SAM 126 may manage any number of processing elements in various combinations of import and export processing elements.

In the example shown in FIG. 3, each of the processing elements 310 includes a connection manager module 127A, shown as connection manager module 127A1 through 127A4 and collectively referred to as 127A. The connection manager module 127A is a local module or portion of the connection manager 127 which resides in each processing element. The connection manager modules 127A work in conjunction with the connection manager 127 in the SAM 126 to manage the dynamic processing element connections in a distributed manner as described herein. Unless otherwise stated herein, reference to the connection manager 127 may include both the connection manager 127 in the SAM and the local connection manager modules 127A in the processing elements 310.

When the SAM 126 receives a newly submitted job, the SAM 126 processes the job and places processing elements in the system. The processing elements 310 track and update the processing element connections as new processing elements are added and existing connections are updated. The task of updating connections is distributed among the processing elements. The connection manager module 127A of each of the processing elements may then communicate back to the connection manager 127 to report any connection changes. The connection manager may then store updated connection information in the connection data 128.

We will now consider an example of managing dynamic connections for new processing elements of a streaming application in a distributed manner with reference to FIG. 3. In this example, we assume that the SAM 126 is initially managing export processing element PE1 310A that is communicating on a connection 312 to import processing element PE2 310B. When the SAM 126 receives 314 a newly submitted job, the SAM 126 processes the job and places processing elements PE3 310C and PE4 310D in the system. The connection manager 127 then communicates 316 to existing processing elements that new processing elements have been added. The connection manager 127 then communicates 318 to start the new processing elements 310C and 310D. Having been notified of new processing elements, existing processing elements such as PE1 310A then communicate 320 with new import processing elements PE4 310D to make connections. Similarly, new export processing elements such as PE3 310C send handshake communications 322 to all import processing elements to make connections where appropriate as discussed below. The connection manager module 127A of each of the processing elements may then communicate 324 back to the connection manager 127 to report any connection changes. The connection manager may then store updated connection information in the connection data 128. In the illustrated example, only the export processing elements report connection information to the connection manager 127.

Figure 4:
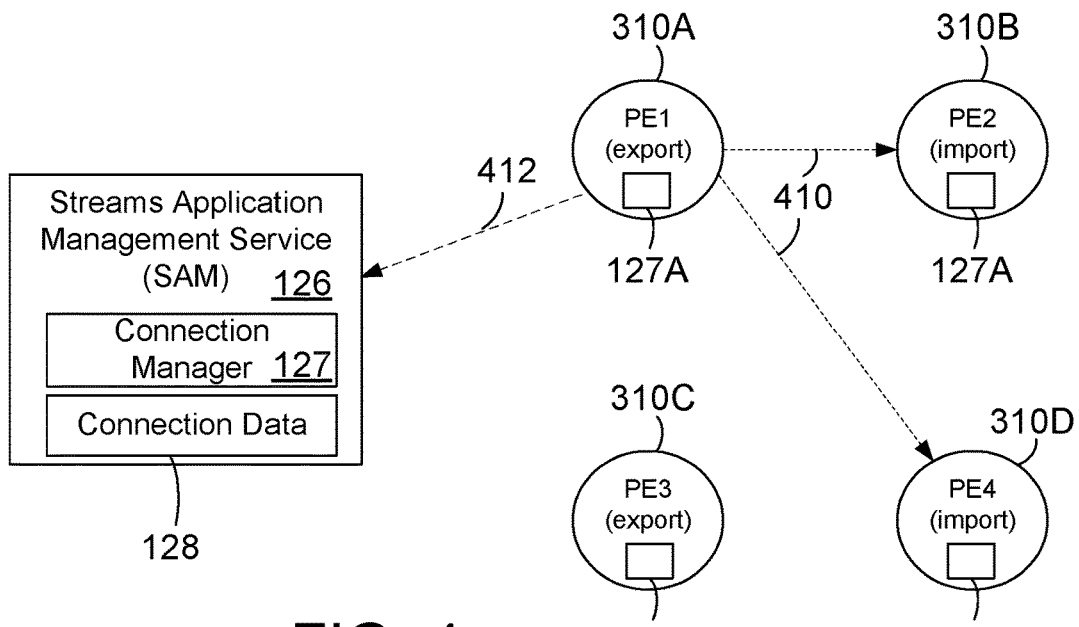
FIG. 4 is another block diagram of an example of distributed management of dynamic processing element connections in a streaming application.

FIG. 4 illustrates a block diagram for an example of distributed updating of connections between processing elements. In this example, we assume that the SAM 126 is managing the four processing elements 310A-D at the completion of the example of FIG. 3. When existing processing elements make connection updates, the processing elements send handshake communications to all corresponding processing elements to update connections. Where an export processing element has update, it will send handshake communications to all import processing elements. In contrast, where an import processing element has an update, it will communicate to all export processing elements. In the illustrated example, export processing element PE1 310A sends communication 410 to import processing element PE2 310B and PE4 310. The connection manager module 127A of the processing elements may then communicate 412 back to the connection manager 127 to report any connection changes. The connection manager may then store updated connection information in the connection data 128. In the illustrated example, only the export processing element PE1 310A reports the connection information to the connection manager 127.

In the above examples, the connection manager communicates with the processing elements and the processing elements communicate with other processing elements to update connection information. This communication may be done in any suitable manner. For example, the processing elements may communicate using standard transmission control protocol (TCP) whether the processing elements are located on the same or different nodes of the computer system. The communication between processing elements is described as a "handshake" communication. The handshake communication is a communication that includes sending a message and waiting for a response from the processing element. In this case, the handshake communication includes a processing element sending a communication to other processing elements to find a matched condition for properties or filters. When a matched condition is found, a connection is set up between the export PE and the import PE. For example, if an import processing element A is configured to only receive tuples from export processing element when matching the condition that "companyName" equals "IBM" (or, any regular expression), and if an export processing element B has this property "companyName" setup to "IBM", then import processing element A can return a handshake "passed" communication with export processing element B, and setup a connection. In contrast, if an import processing element C has property "companyName" setup to "Google", then the handshake will fail and the connection cannot be set up between export processing element B and import processing element C.

Other properties or filters that could be a condition to indicate a connection include the type of tuple data or an identification of the processing element type. For example, a property of the operator could be that it operates on a specific type of video data to provide a specific function. An operator changes behavior when an operator property is updated such as changing one of these conditions for connection. For example, an operator may change to process data that matches a different "companyName".

Figure 5:
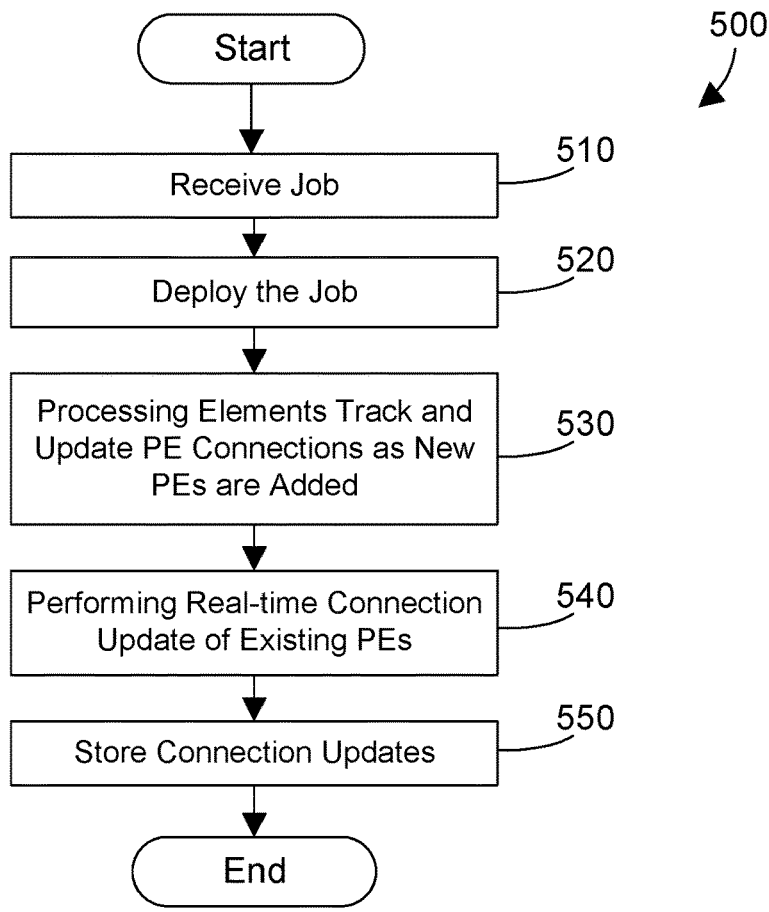
FIG. 5 is a flow diagram of a method for distributed management of dynamic processing element connections in a streaming application.

Referring to FIG. 5, a method 500 shows one suitable example for distributed management of dynamic processing element connections in a streaming application. Portions of method 500 are preferably performed by the streams application management service 126, the connection manager 127, and the connection manager modules 127A shown in FIG. 3. First, receive a job (step 510). Next, deploy the job by placing the processing elements of the job on computer resources (step 520). Track and update processing element connections as new processing elements are added and connections of processing elements are updated (step 530). The processing elements then perform real-time connection updates (step 540). Then store updated connection information from the real-time connection updates (step 550). Method 500 is then done.

Figure 6:
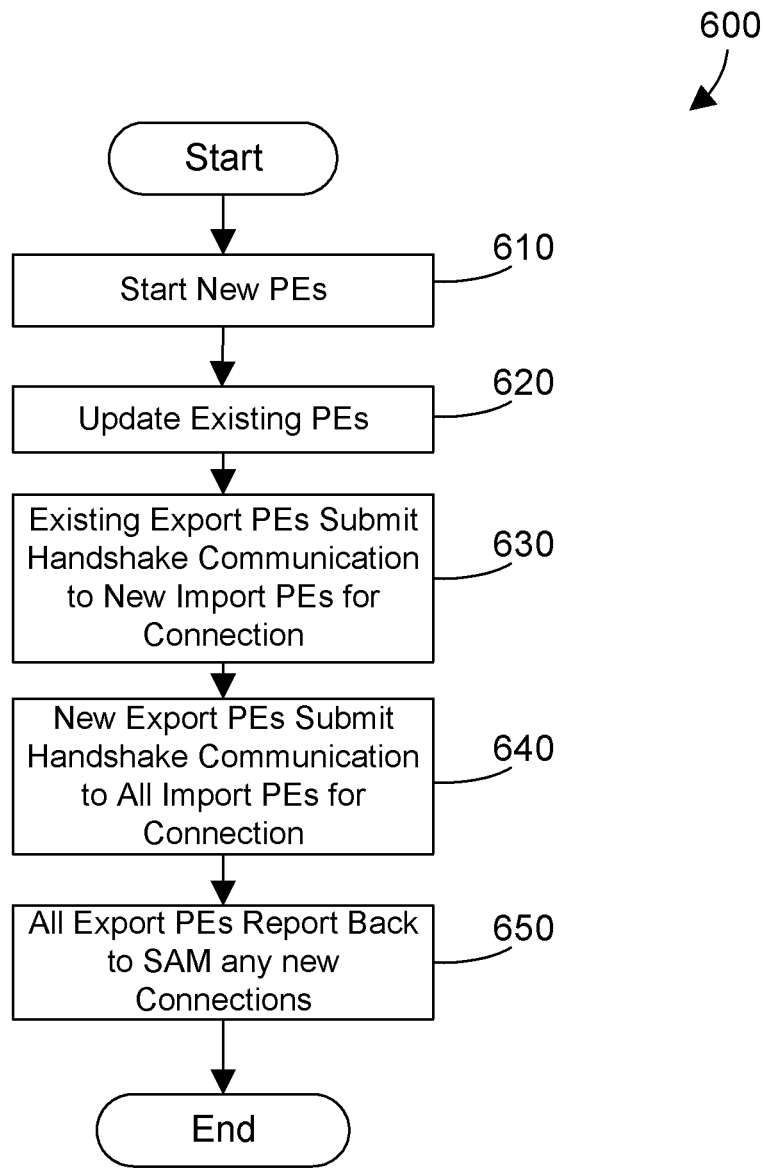
FIG. 6 is a flow diagram of a specific method for step 530 in FIG. 5.

FIG. 6 shows a method 600 for tracking and updating processing element connections as new processing elements are added and connections of processing elements are updated. Method 600 thus shows one suitable example of performing step 530 in FIG. 5. Start new processing elements (step 610). Update connection information on existing processing elements (step 620). Existing export processing elements submit handshake communication to new import processing elements for connection (step 630). New export processing elements submit handshake communication to all import processing elements for connection (step 640). All export processing elements report back to streams application management service any new connections (step 650). The method 800 is then done.

Figure 7:
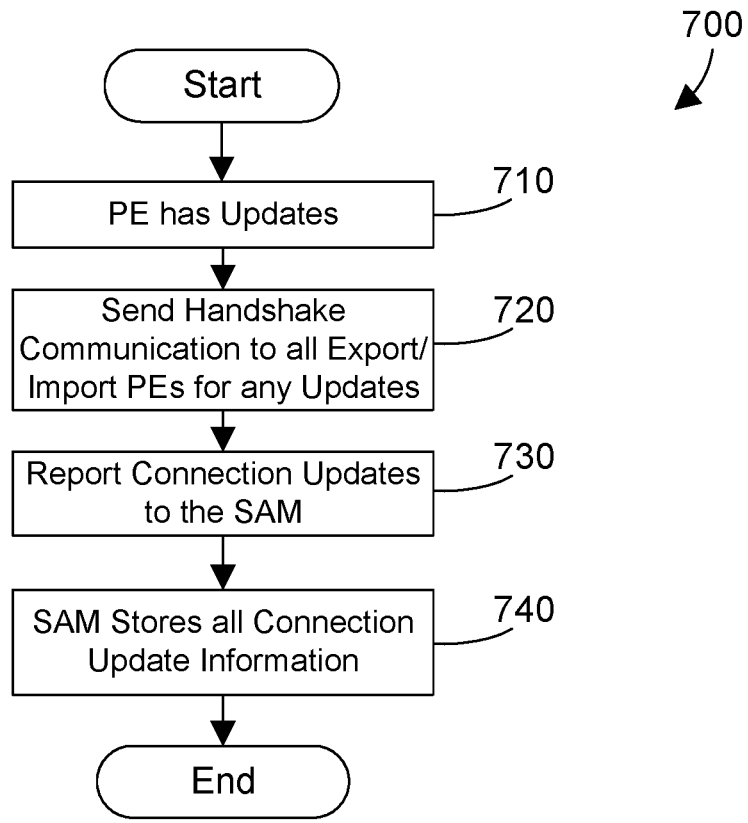
FIG. 7 is a flow diagram of a specific method for step 540 in FIG. 5.

FIG. 7 shows a method 700 for performing real time connection updates of processing elements. Method 700 thus shows one suitable example of performing step 540 in FIG. 5. A processing element is determined to have updates (step 710). The processing element sends handshake communications to all export or import processing elements respectively for the updates (step 720). Next, the processing elements reports the connection updates to the connection manager in the streams application management service (step 730). The connection manager in the streams application management service then stores the connection update information in the connection data (step 740). The method 700 is then done.

Figure 8:
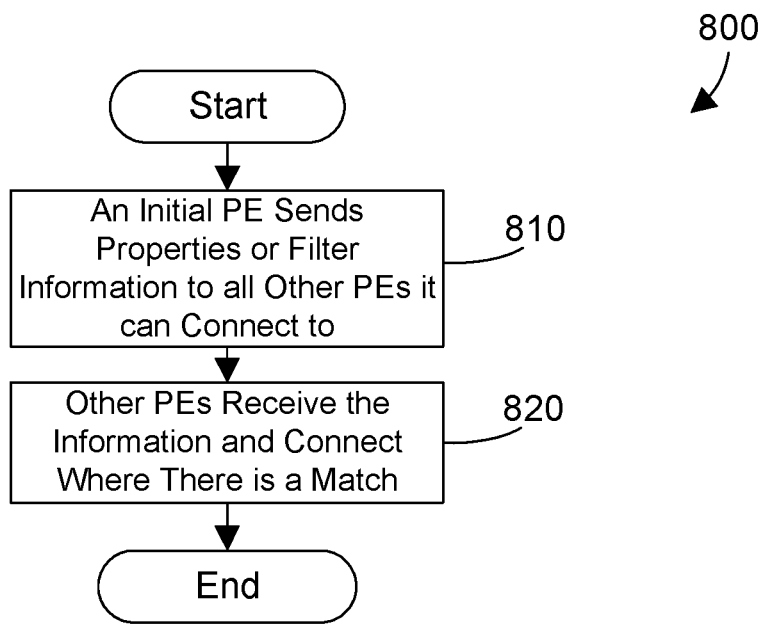
FIG. 8 is a flow diagram of a method of processing elements making connections.

FIG. 8 shows a method 800 for processing handshake communications between processing elements. Method 800 thus shows one suitable example of performing step 720 in FIG. 7. A processing element sends properties or filter information to all other processing elements it can connect to (step 810). The other processing elements receive the information and connect to the processing elements where there is a match in the properties or filter information (step 820). The method 800 is then done.

The claims and disclosure herein support an apparatus comprising: at least one processor; a memory coupled to the at least one processor; a connection manager residing in the memory and executed by the at least one processor that manages connections of a plurality of processing elements in a streaming application; and wherein the processing elements track and update processing element connections as new connections are added; and wherein connection update information for the updated processing element connections is stored by the connection manager.

The claims and disclosure herein further support a computer-implemented method executed by at least one processor for distributed management of dynamic processing element connections in a streaming application comprising: processing elements track and update processing element connections as new connections are added; the processing elements perform real-time update of connections of existing processing elements; and processing elements store connection update information for the updated connections by sending the connection update information to a connection manager.

The claims and disclosure herein additionally support a computer-implemented method executed by at least one processor for distributed management of dynamic processing element connections in a streaming application comprising: processing elements tracking and updating processing element connections as new connections are added with a connection manager residing in the processing elements; the processing elements perform real-time update of connections of existing processing elements; processing elements store connection update information for the updated connections by sending the connection update information to a connection manager; and wherein existing export processing elements communicate to new import processing elements for connection and new export processing elements communicate to all import processing elements for connection.

Dynamic connections between processing elements of a streaming application are managed in a distributed manner by the processing elements to increase efficiency and performance of real-time connection updates. The streams application management service includes a connection manager that notifies all processing elements when a job with a new processing element is submitted. Each processing element dynamically maintains its own connections based on connection data and reports connection updates to the connection manager.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a connection manager residing in the memory and executed by the at least one processor that manages dynamic connections between a plurality of processing elements in a streaming application, wherein the plurality of processing elements comprise a first processing element that is an existing export processing element and a second processing element that is a new import processing element, wherein the first processing element communicates a first connection condition to the second processing element, and when the second processing element has a second connection condition that matches the first connection condition, the second processing element communicates with the first processing element to establish a dynamic connection from the first processing element to the second processing element.

2. The apparatus of claim 1 further comprising a portion of the connection manager residing in the plurality of processing elements.

3. The apparatus of claim 1 wherein the plurality of processing elements further comprise a third processing element that is a new export processing element and a fourth processing element that is an existing import processing element, wherein the third processing element communicates a third connection condition to the fourth processing element, and when the fourth processing element has a fourth connection condition that matches the third connection condition, the fourth processing element communicates with the third processing element to establish a dynamic connection from the third processing element to the fourth processing element.

4. The apparatus of claim 1 wherein the plurality of processing elements perform real-time connection update of existing processing elements of the plurality of processing elements.

5. The apparatus of claim 4 wherein the plurality of processing elements perform real-time connection update of existing processing elements of the plurality of processing elements by sending a communication to all export processing elements of the plurality of processing elements or import processing elements of the plurality of processing elements for any updates.

6. The apparatus of claim 5 wherein the communication includes sending properties and filter information to all processing elements connected to a processing element.

7. The apparatus of claim 6 wherein the properties and filter information include a condition that defines when to establish a connection between processing elements.

8. A computer-implemented method executed by at least one processor for distributed management of dynamic processing element connections in a streaming application comprising:
   executing the streaming application, wherein the streaming application comprises a plurality of processing elements, wherein the plurality of processing elements comprise a first processing element that is an existing export processing element and a second processing element that is a new import processing element;
   the first processing element communicating a first connection condition to the second processing element;
   when the second processing element has a second connection condition that matches the first connection condition, the second processing element communicating with the first processing element to establish a dynamic connection from the first processing element to the second processing element; and
   the first processing element and second processing element establishing the dynamic connection from the first processing element to the second processing element.

9. The method of claim 8 wherein the plurality of processing elements track and update connections between the plurality of processing elements with a connection manager residing in the plurality of processing elements.

10. The method of claim 8 wherein the plurality of processing elements further comprise a third processing element that is a new export processing element and a fourth processing element that is an existing import processing element, wherein the method further comprises:
the third processing element communicating a third connection condition to the fourth processing element; and
when the fourth processing element has a fourth connection condition that matches the third connection condition, the fourth processing element communicates with the third processing element to establish a dynamic connection from the third processing element to the fourth processing element.

11. The method of claim 8 wherein the plurality of processing elements perform real-time connection update of existing processing elements of the plurality of processing elements.

12. The method of claim 11 wherein the plurality of processing elements perform real-time connection update of existing processing elements of the plurality of processing elements by sending handshake communication to all export processing elements of the plurality of processing elements or import processing elements of the plurality of processing elements for any updates.

13. The method of claim 12 wherein the communication includes sending properties and filter information to all of the plurality of processing elements connected to a selected processing element.

14. The method of claim 13 wherein the properties and filter information include a condition that defines when to establish a connection between processing elements.

15. A computer-implemented method executed by at least one processor for distributed management of dynamic processing element connections in a streaming application comprising:
executing the streaming application, wherein the streaming application comprises a plurality of processing elements;
the plurality of processing elements establishing, tracking and updating processing element connections as new processing element connections are added with a connection manager residing in the plurality of processing elements;
the plurality of processing elements performing real-time update of connections of existing processing elements of the plurality of processing elements;
the plurality of processing elements storing connection update information for the updated connections by sending the connection update information to a connection manager;
existing export processing elements of the plurality of processing elements communicating a first connection condition to new import processing elements of the plurality of processing elements for connection, and when the first connection condition is satisfied, dynamically establishing a connection between at least one of the existing export processing elements and at least one of the new import processing elements; and
new export processing elements of the plurality of processing elements communicating a second connection condition to all import processing elements of the plurality of processing elements for connection, and when the second connection condition is satisfied, dynamically establishing a connection between at least one of the new export processing elements and at least one of the import processing elements.

16. The method of claim 15 wherein the processing elements of the plurality of processing elements perform real-time connection update of existing processing elements of the plurality of processing elements.

17. The method of claim 15 wherein the plurality of processing elements perform real-time connection update of existing processing elements of the plurality of processing elements by sending a communication to all export processing elements of the plurality of processing elements or import processing elements of the plurality of processing elements for any updates.

18. The method of claim 17 wherein the communication includes sending a condition that defines a connection to all of the plurality of processing elements connected to a selected processing element.

* * * * *